(12) United States Patent
Tatsumi

(10) Patent No.: US 6,198,499 B1
(45) Date of Patent: Mar. 6, 2001

(54) RADIO-COMMUNICATION VIDEO TERMINAL DEVICE

(75) Inventor: Masahiro Tatsumi, Noda (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/961,430

(22) Filed: Oct. 30, 1997

(30) Foreign Application Priority Data

Oct. 30, 1996 (JP) .................................................. 8-287725

(51) Int. Cl.[7] .................................................. H04N 7/14
(52) U.S. Cl. .................................................. 348/17; 714/746
(58) Field of Search .................................................. 348/6–10, 14–17, 348/423, 453, 462, 537; 370/342, 441; 371/2.1, 42; 375/360; 395/200.77–200.79; 455/68–70; 714/746–747, 751–753, 758, 7.26, 812, 815

(56) References Cited

U.S. PATENT DOCUMENTS

| | | | |
|---|---|---|---|
| 5,367,331 | * 11/1994 | Secher et al. ........................ | 348/17 |
| 5,477,542 | * 12/1995 | Takahara et al. ..................... | 348/14 |
| 5,579,317 | * 11/1996 | Pang et al. .......................... | 348/423 |
| 5,617,333 | *  4/1997 | Oyamada et al. .................... | 371/2.1 |
| 5,675,375 | * 10/1997 | Riffee ................................. | 348/15 |
| 5,724,369 | *  3/1998 | Brailean et al. ...................... | 714/747 |
| 5,774,483 | *  6/1998 | Hwang ................................. | 371/62 |
| 5,844,918 | * 12/1998 | Kato ..................................... | 714/751 |
| 5,862,153 | *  1/1999 | Kikuchi et al. ...................... | 371/42 |

* cited by examiner

Primary Examiner—Duc Nguyen
Assistant Examiner—George Eng

(57) ABSTRACT

Structure is provided to realize transmission of video with no transmission error over a transmission line having a low transmission performance. A video communication video terminal device which is provided with a video transmission adapter includes a transmission video-frame disassembling portion for correcting a transmission error in video-data, detecting an error in the corrected video data after correction of transmission error therein and extracting only errorless video-frame data, a transmission video frame generating portion for generating a video frame composed of video frame data to be transmitted, a control signal for controlling the other terminal to be communicated and an error-correction code attached the data and a video control portion for instructing extraction of errorless video-frame data from the received video data and controlling the video frame data to be transmitted according to the control signal.

7 Claims, 10 Drawing Sheets

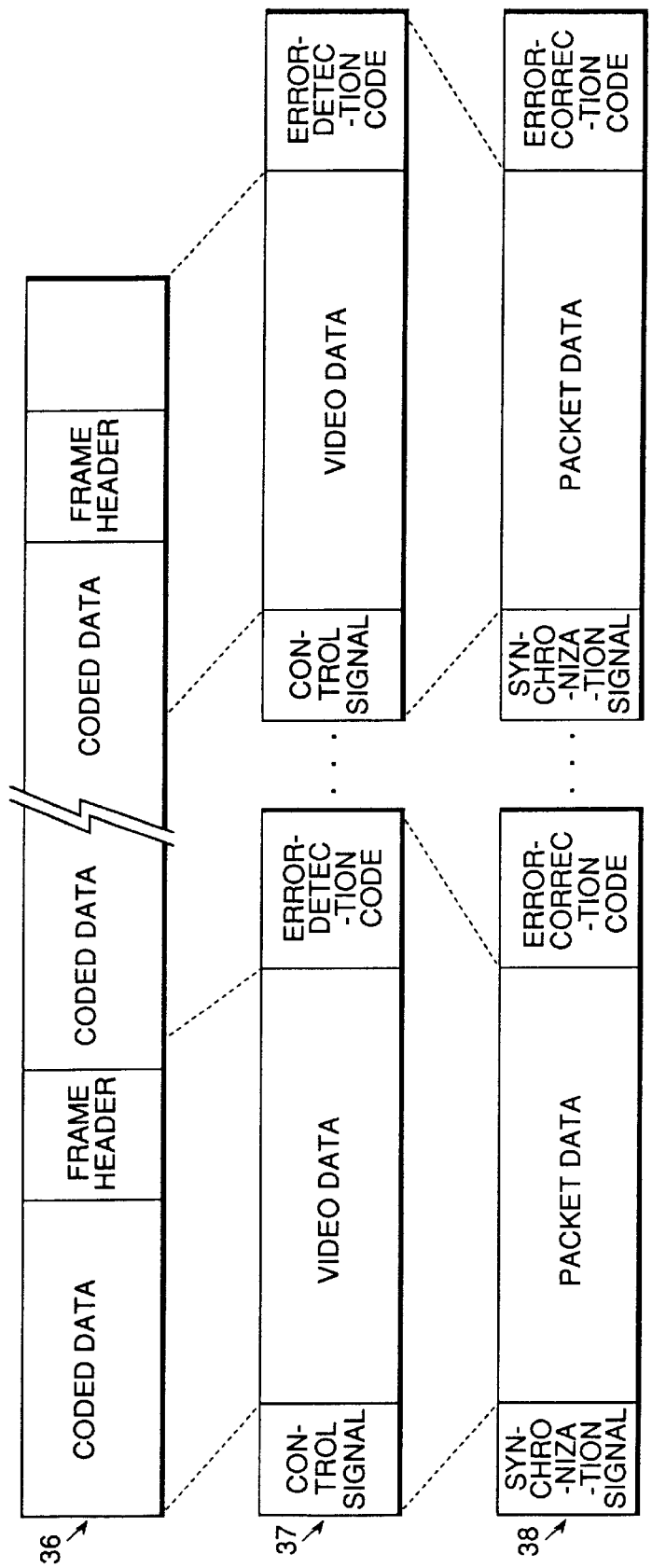

RADIO-COMMUNICATION VIDEO TERMINAL DEVICE

BACKGROUND OF THE INVENTION

The present invention relates to a radio-communication video terminal device such as a TV-telephone by real-time transmission of video (with moving picture) and sound signals over radio channels having a low transmission performance particularly.

Owing to miniaturization of apparatuses advanced by the semiconductor technology development and an advance of video coding-decoding techniques, real-time transmission of video signals, which required the use of a cable line of high-transmission quality such as ISDN (Integrated Services Digital Network), has been possible to conduct over radio channels having a low transmission rate.

There's an exemplified structure of a radio-communication video terminal device utilizing a radio transmission channel. The radio-communication video terminal device comprises an antenna portion for transmitting and receiving radio signals, a RF (radio-frequency converting circuit) portion for converting a high-frequency-band signal received from the antenna portion into a signal in a frequency-band of a base-band and converting a base-band signal into a high-frequency-band signal, a RF-I/F (radio-frequency and intermediate frequency) portion for extracting digital video and digital voice signals from the signal in a frequency-band of a base-band from the RF portion and multiplexing and converting digital video and digital audio signals into signals in a frequency-band of a base-band, a video-transmission adapter portion for correcting an error in a signal from the RF-I/F portion or adding an error-correcting code to video frame data to be transmitted, a video codec portion for decoding video frame data from the video transmission adapter portion or coding a video signal, a monitor portion for displaying a video signal from the video codec portion, a video camera portion for inputting a video signal into the video codec portion, a voice codec portion for decoding voice signal from the RF-I/F portion or coding a voice signal, a speaker portion for reproducing a voice signal from the voice codec portion and a microphone portion for inputting a voice signal into the voice codec portion.

There's an exemplified structure of the prior art video-transmission adapter portion, which comprises an error-correction frame disassembling portion for correcting an error in a video signal outputted from the RF-I/F portion and an error-correction frame generating portion for generating an error-correction frame by adding an error-correction code to video frame data outputted from the video codec portion.

There's a data format to be used in the error-correction frame disassembling portion. The data format applies to data outputted from the RF-I/F portion to the error-correction frame disassembling portion and data outputted from the error-correction frame disassembling portion to the video codec portion.

There's a data format to be used in the error-correction frame generating portion. The data format applies to data outputted from the video codec portion to the error-correction frame generating portion and data outputted from the error-correction frame generating portion to the RF-I/F portion.

The operation of the radio-communication video terminal device using the video-transmission adapter portion will be described below.

At the receiving side, a high-frequency band signal received through the antenna portion is converted by the RF portion to a signal in a frequency-band of a base-band which is then divided into video data and voice data by the RF-I/F portion. The separated video data is input to the video transmission adapter in which the input data is subjected to error-correction by the error-correction frame disassembling portion and from which only video frame data is outputted to the video codec portion. The video codec portion decodes the input video frame data and outputs the decoded video signal to the monitor. On the other hand, the voice data outputted from the RF-I/F portion enters into the voice codec portion by which it is decoded and outputted as a voice signal to the speaker portion.

At a transmitting side, a video signal through the camera is input to the video codec portion in which the input signal is encoded and outputted as the encoded video frame data to the video transmission adapter. The error-correction frame generating portion generates error-correction frame data by adding an error correction code to the encoded video frame data and outputs the error-correction frame-data to the RF-I/F portion. On the other hand, a voice signal outputted from the microphone is encoded by the voice codec portion and then outputted to the RF-I/F portion. The RF-I/F portion multiplexes the encoded video data and voice data, converts the multiplexed data into a signal in a frequency-band of a base-band and outputs it to the RF portion which in turn converts the received signal into a high-frequency band signal and outputs the converted ted signal to the antenna portion.

The above-described prior art radio-communication video terminal device using radio transmission channels may receive erroneous video data that may be displayed with faults since the received data may contain not only correctable random errors but burst errors that are hardly corrected.

SUMMARY OF THE INVENTION

The present invention was made to provide a radio-communication video terminal device which is capable of displaying non-fault video in synchronization with voice signal.

A radio-communication video terminal device according to the present invention has an video transmission adapter which is composed of transmission video frame disassembling means for correcting a transmission error of video data, detecting an error in the corrected video data and extracting video frame data containing no error, transmission video frame generating means for generating a video frame to be transmitted by providing video-frame data with an error-correction code and a control signal for controlling other terminal with which the device will communicate, and video control means for instructing extraction of errorless video-frame data from the received video data and for controlling the video data according to the control signal.

The transmission video-frame disassembling portion is also composed of error-correcting means for executing error-correction, packet disassembling means for detecting an error and outputting only video-frame data and data selecting means for extracting only errorless video-frame data.

The transmission video-frame generating portion is composed of means for generating intraframe-coded data from interframe-coded data, data change-over means for changing over from the intraframe-coded data to the interframe-coded data and vice versa, packet assembling means for assembling a packet composed of video-frame data, a control signal for controlling the other terminal to be communicated and an error detection code for detecting an error, error-correction frame generating means for generating a frame composed of an error-correction code for correcting a transmission error, a synchronization signal and packet data.

In the above-mentioned radio-communication video terminal device, the video transmission adapter performs the error-detecting operation on the error-corrected video data to output errorless video-frame data that can be reproduced with no fault other to be communicated. In case if the data should contain an error, the device can require other terminal to be communicated intraframe-coding data, thus enabling the receiving terminal to quickly restore normal reproduction of video signals in synchronization with voice signals.

BRIEF DESCRIPTION OF DRAWINGS

FIG. 10 is a data format to be used in the transmission video-frame generating portion of FIG. 9.

PREFERRED EMBODIMENTS OF THE INVENTION

Prior to explaining preferred embodiments of the present invention, prior art radio-communication video terminal device will be described below as references for the present invention.

Owing to miniaturization of apparatuses advanced by the semiconductor technology development and an advance of video coding-decoding techniques, real-time transmission of video signals, which required the use of a cable line of high-transmission quality such as ISDN (Integrated Services Digital Network), has been possible to conduct over radio channels having a low transmission rate.

Figure 1:
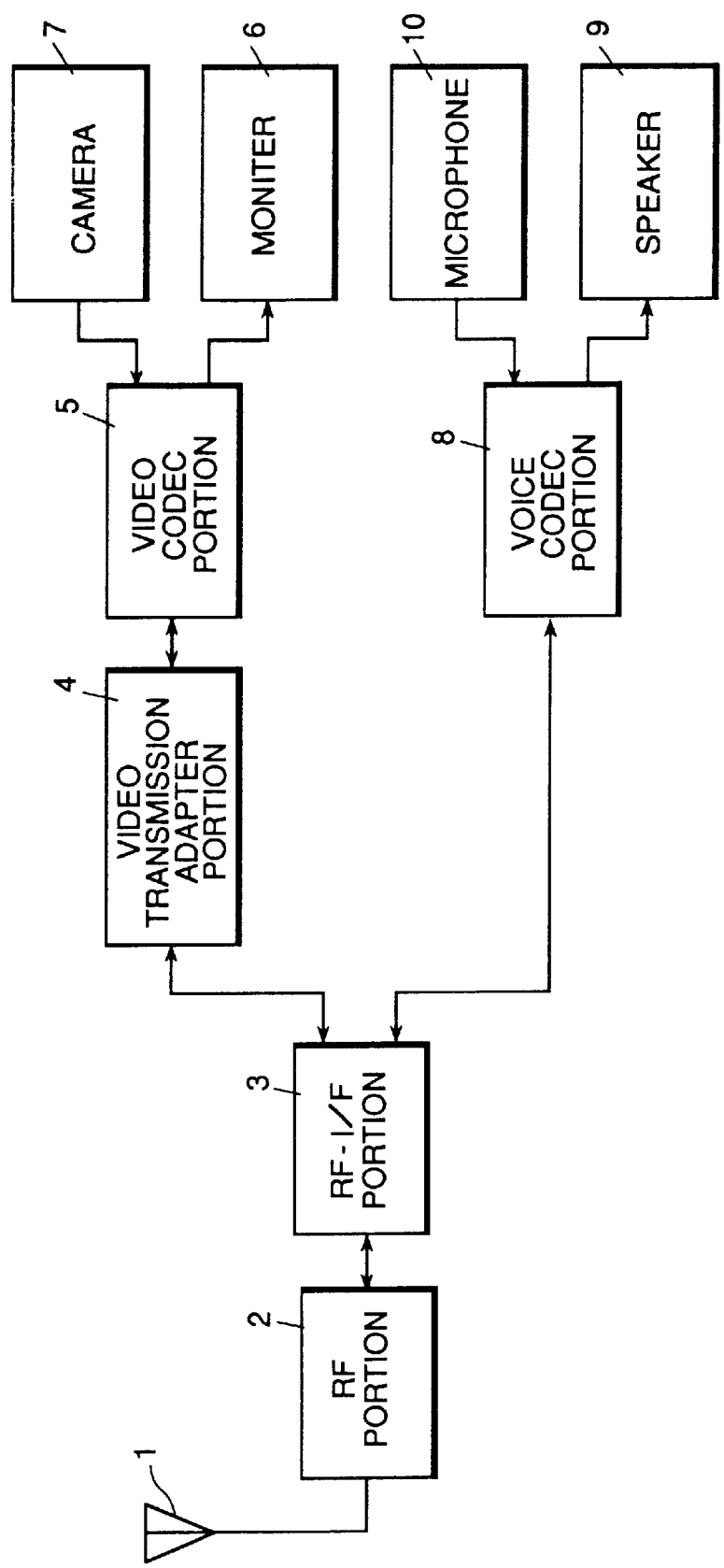
FIG. 1 is a construction block diagram of a radio-communication video terminal device.

FIG. 1 is illustrative of an exemplified structure of a radio-communication video terminal device utilizing a radio transmission channel. As shown in FIG. 1, the radio-communication video terminal device comprises an antenna portion 1 for transmitting and receiving radio signals, a RF (radio-frequency converting circuit) portion 2 for converting a high-frequency-band signal received from the antenna portion 1 into a signal in a frequency-band of a base-band and converting a base-band signal into a high-frequency-band signal, a RF-I/F (radio-frequency and intermediate frequency) portion 3 for extracting digital video and digital voice signals from the signal in a frequency-band of a base-band from the RF portion 2 and multiplexing and converting digital video and digital audio signals into signals in a frequency-band of a base-band, a video-transmission adapter portion 4 for correcting an error in a signal from the RF-I/F portion 3 or adding an error-correcting code to video frame data to be transmitted, a video codec portion 5 for decoding video frame data from the video transmission adapter portion 4 or coding a video signal, a monitor portion 6 for displaying a video signal from the video codec portion 5, a video camera portion 7 for inputting a video signal into the video codec portion 5, a voice codec portion 8 for decoding voice signal from the RF-I/F portion 3 or coding a voice signal, a speaker portion 9 for reproducing a voice signal from the voice codec portion 8 and a microphone portion 10 for inputting a voice signal into the voice codec portion 6.

Figure 2:
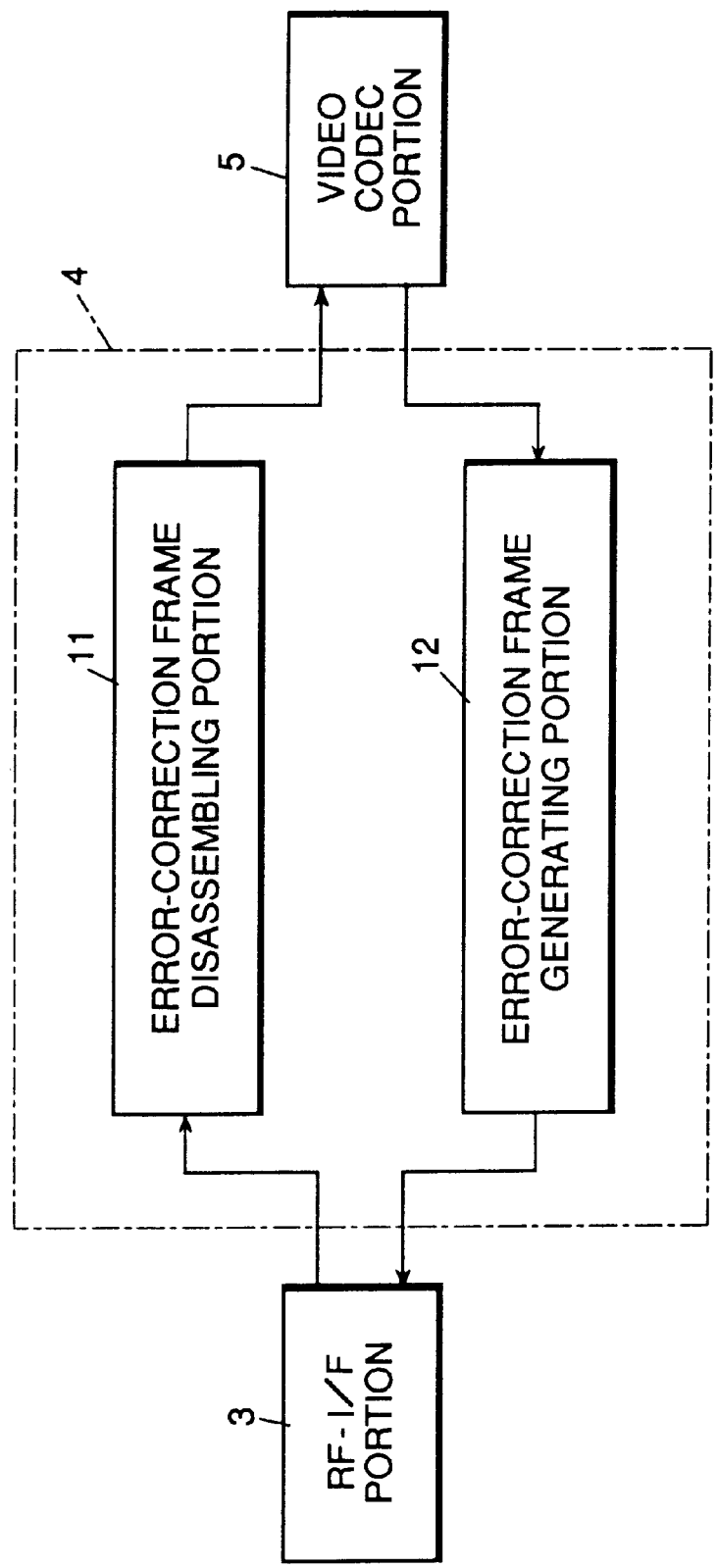
FIG. 2 is a construction block-diagram of a prior art video transmission adapter.

FIG. 2 illustrates an exemplified structure of the prior art video-transmission adapter portion 4 shown in FIG. 1, which comprises an error-correction frame disassembling portion 11 for correcting an error in a video signal outputted from the RF-I/F portion 3 (FIG. 1) and an error-correction frame generating portion 12 for generating an error-correction frame by adding an error-correction code to video frame data outputted from the video codec portion 5 (FIG. 1).

Figure 3:
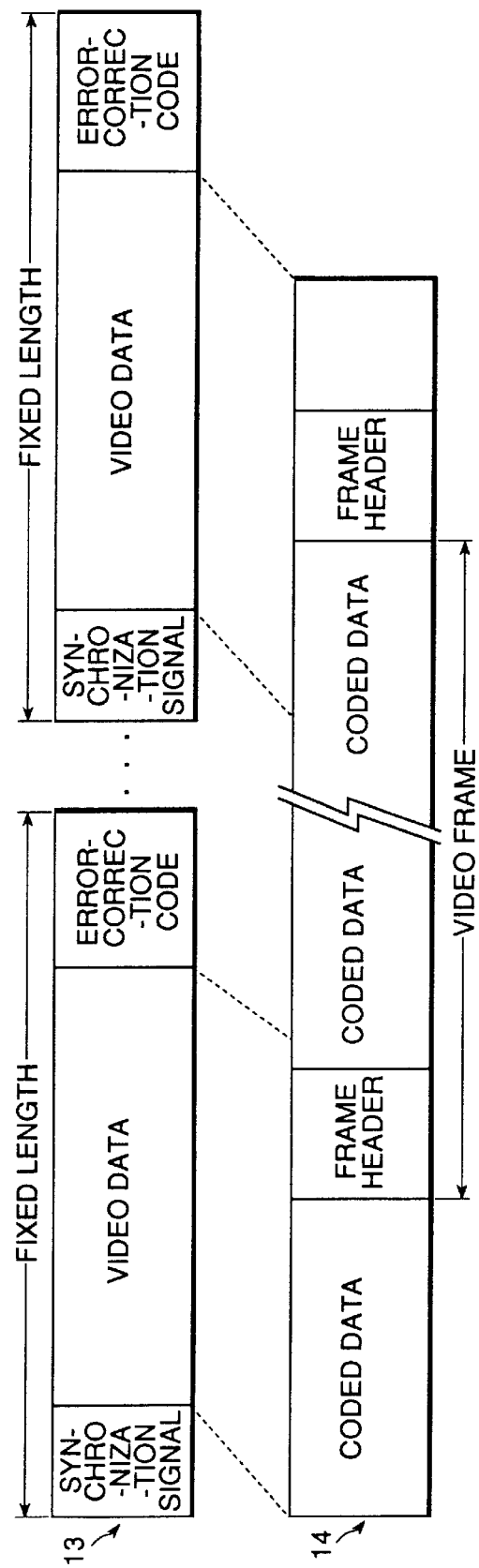
FIG. 3 is a data format to be used in the error-correction frame disassembling portion of a radio-communication video terminal device.

FIG. 3 is illustrative of a data format to be used in the error-correction frame disassembling portion 11. In FIG. 3, there is shown data 13 outputted from the RF-I/F portion 3 to the error-correction frame disassembling portion 11 and data 14 outputted from the error-correction frame disassembling portion 11 to the video codec portion 5.

Figure 4:
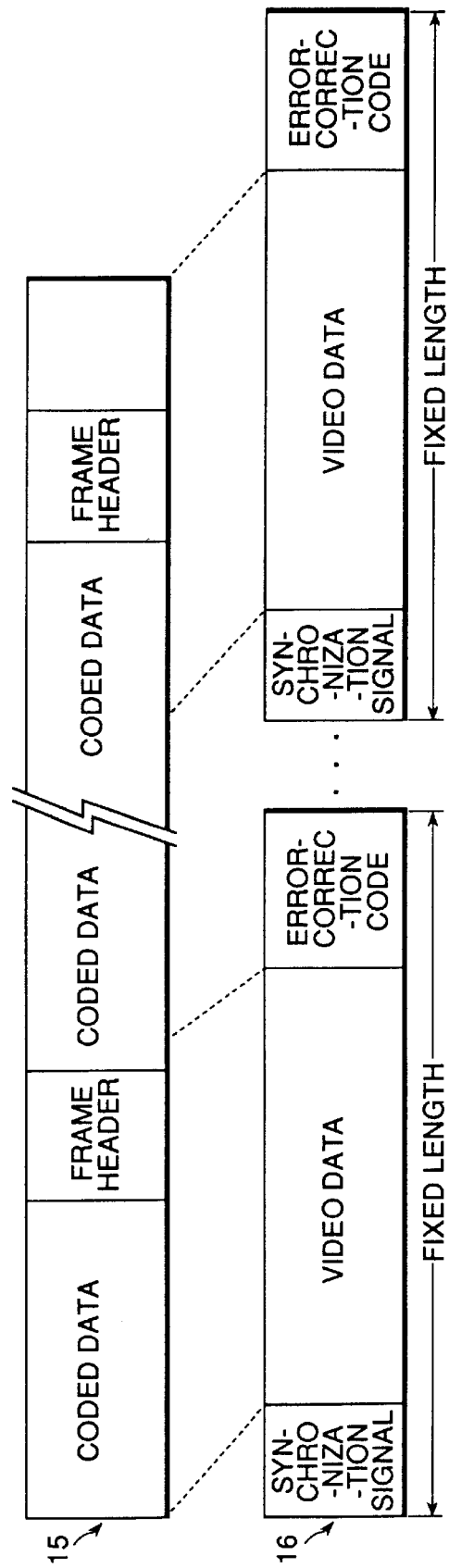
FIG. 4 is a data format to be used in the error-correction frame generating portion of a radio-communication video terminal device.

FIG. 4 is illustrative of a data format to be used in the error-correction frame generating portion 12. In FIG. 4, there is shown data 15 outputted from the video codec portion 5 to the error-correction frame generating portion 12 and data 16 outputted from the error-correction frame generating portion 12 to the RF-I/F portion 3.

Referring to FIGS. 1 and 2, the operation of the radio-communication video terminal device (FIG. 1) using the video-transmission adapter portion 4 (FIG. 2) will be described below.

At the receiving side, a high-frequency band signal received through the antenna portion 1 is converted by the RF portion 2 to a signal in a frequency-band of a base-band which is then divided into video data and voice data by the RF-I/F portion 3. The separated video data 13 (FIG. 3) is input to the video transmission adapter 4 in which the input data is subjected to error-correction by the error-correction frame disassembling portion 11 and from which only video frame data 14 (FIG. 3) is outputted to the video codec portion 5. The video codec portion 5 decodes the input video frame data 14 and outputs the decoded video signal to the monitor 6. On the other hand, the voice data outputted from the RF-I/F portion 3 enters into the voice codec portion 8 by which it is decoded and outputted as a voice signal to the speaker portion 10.

At a transmitting side, a video signal through the camera 7 is input to the video codec portion 5 in which the input signal is encoded and outputted as the encoded video frame data 15 (FIG. 4) to the video transmission adapter 4. The error-correction frame generating portion 12 generates error-correction frame data 16 (FIG. 4) by adding an error correction code to the encoded video frame data and outputs the error-correction frame-data 16 to the RF-I/F portion 3. On the other hand, a voice signal outputted from the microphone 9 is encoded by the voice codec portion 8 and then outputted to the RF-I/F portion 3. The RF-I/F portion 3 multiplexes the encoded video data and voice data, converts the multiplexed data into a signal in a frequency-band of a base-band and outputs it to the RF portion 2 which in turn converts the received signal into a high-frequency band signal and outputs the converted signal to the antenna portion 1.

The above-described prior art radio-communication video terminal device using radio transmission channels may receive erroneous video data that may be displayed with faults since the received data may contain not only correctable random errors but burst errors that are hardly corrected.

Referring now to FIGS. 5 to 10 and FIG. 1 showing a whole system of radio-communication video terminal (in common with prior art above-described), preferred embodiments of the present invention will be described below in detail.

Figure 5:
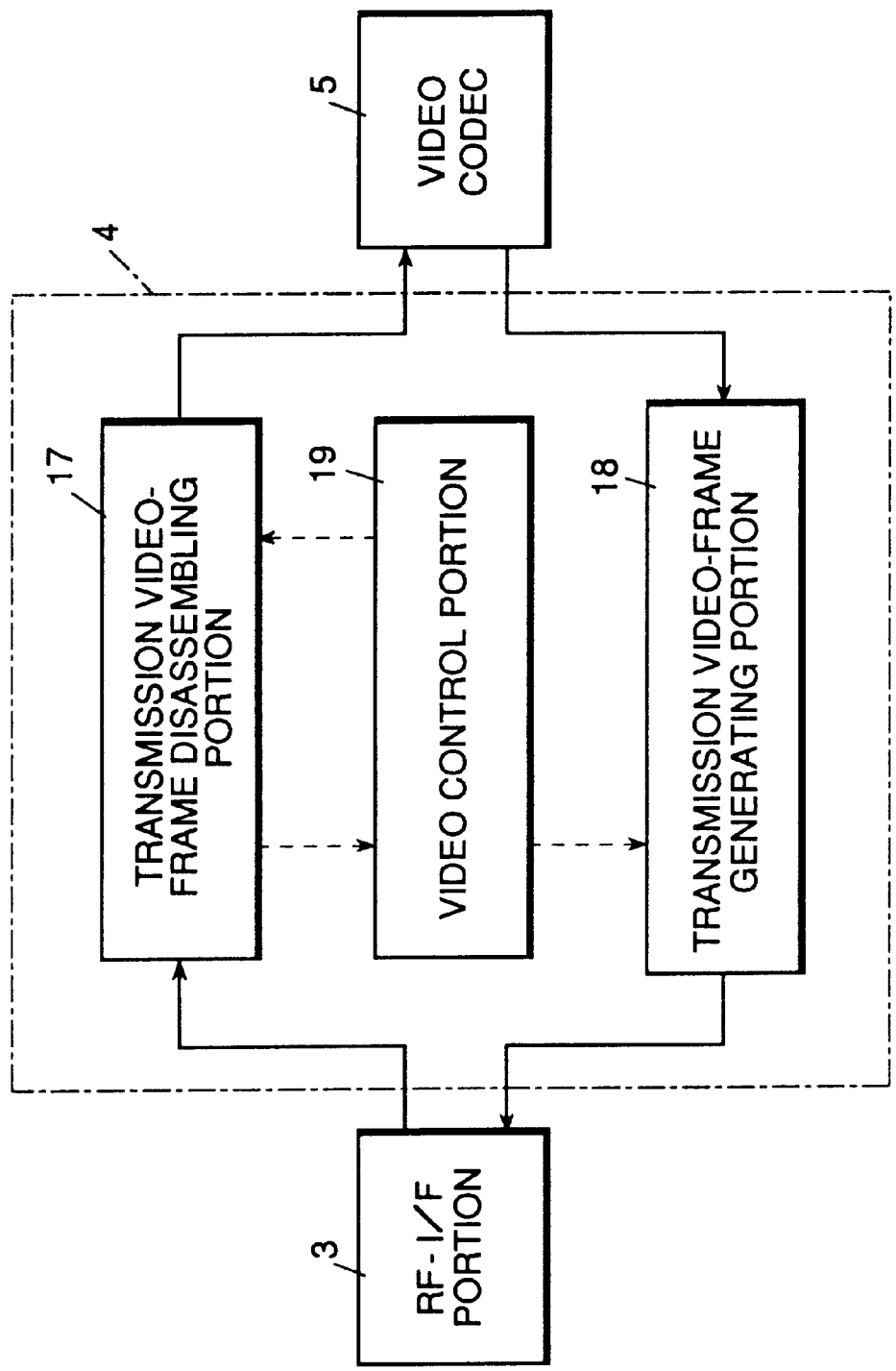
FIG. 5 is a construction block-diagram of video-transmission adapter portion of a radio-communication video terminal device according to the present invention.

FIG. 5 is a block diagram of a video transmission adapter 4 for use in a radio-communication video terminal device. As shown in FIG. 4, this adapter 4 is composed of a transmission video-frame disassembling portion 17 for correcting an error in a video signal outputted from a RF-I/F portion 3, detecting an error in the error-corrected data and extracting only errorless video-frame data, a transmission video-frame generating portion 18 for generating a transmission video frame by providing video frame data from a video codec portion 5 with a control signal, an error-correction code and an error-detection code, and a video control portion 19 for controlling the transmission video-frame disassembling portion 17 and a transmission video-frame generating portion 18.

The transmission video-frame generating portion for generating a transmission video-frame for video frame data outputted from the video codec portion is done by adding thereto error-correction and error-detection reduntant codes and there is a control signal for indicating a detection of error in the received video signal to other terminal to be communicated with.

Figure 6:
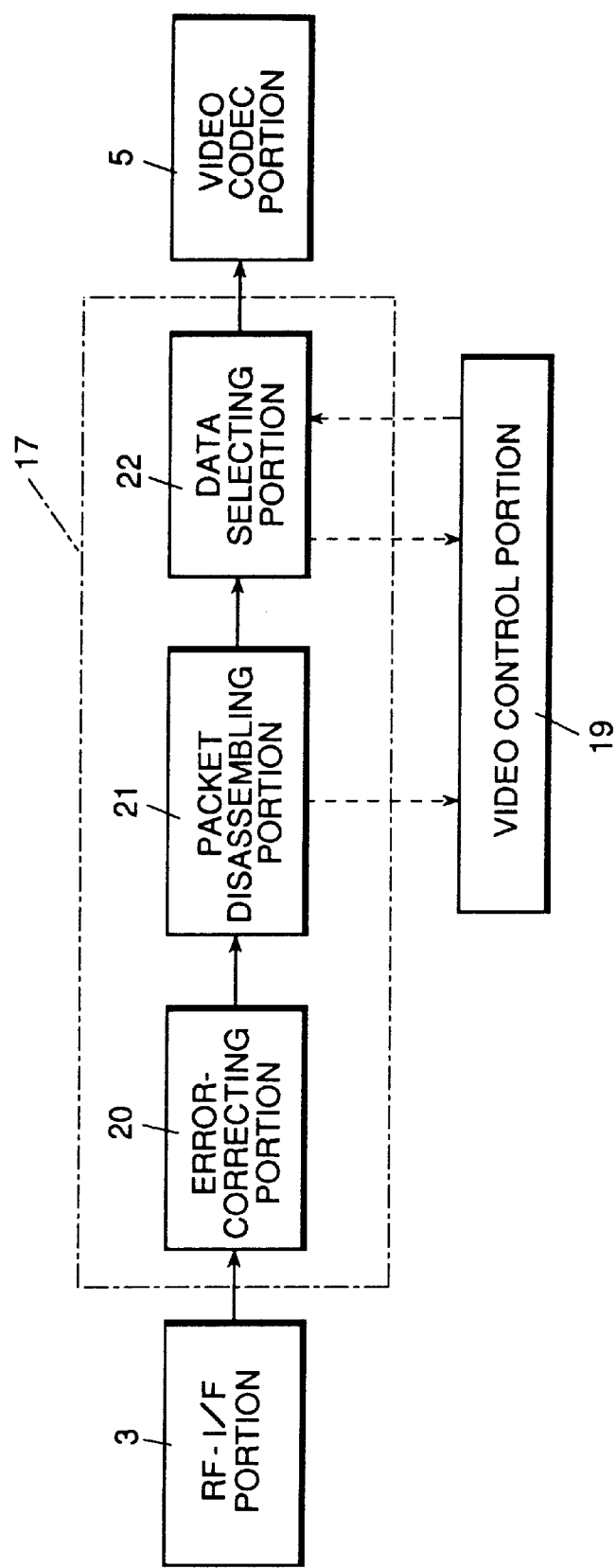
FIG. 6 is a construction block diagram of a transmission video-frame disassembling portion of the video transmission adapter portion of FIG. 5.

FIG. 6 is a block diagram of the transmission video-frame disassembling portion 17 which is composed of an error-correcting portion 20 for correcting an error in a transmission video data from a RF-I/F portion 3; a packet disassembling portion 21 for detecting an error in the error-corrected data and outputting only errorless video-frame and a data selecting portion 22 for extracting only errorless video-frame data from sequential video-frame data.

Figure 7:
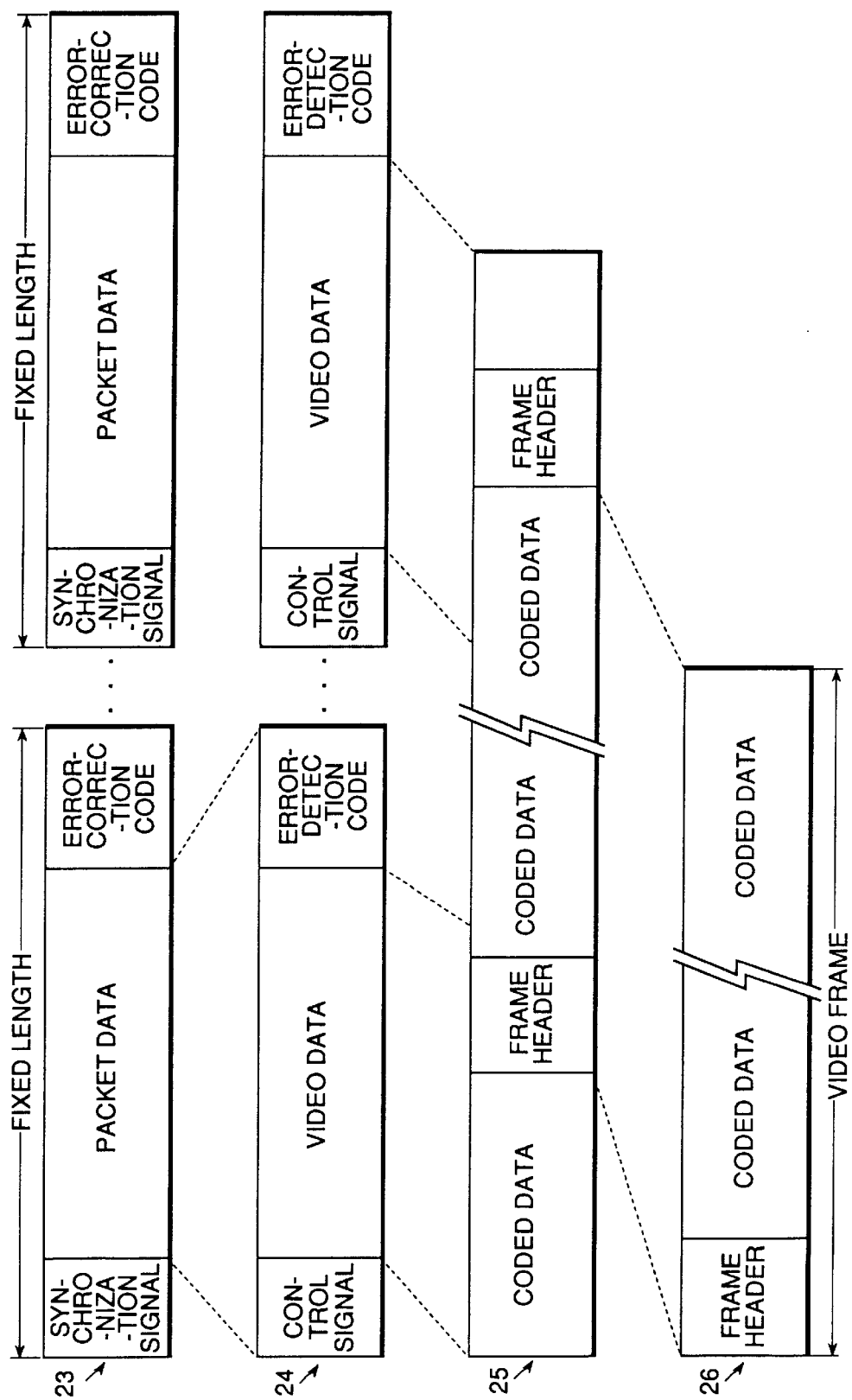
FIG. 7 is a data format to be used in the transmission video-frame disassembling portion of FIG. 6.

FIG. 7 shows a format of data to be used in the block-diagram of FIG. 6. In FIG. 7, there is shown data 23 outputted from the RF-I/F portion 3 to the error correcting portion 20, data 24 outputted from the error-correcting portion 20 to the packet disassembling portion 21, data 25 outputted from the packet disassembling portion 21 to the data selecting portion 22 and data 26 outputted from the data selecting portion 22 to the video codec portion 5.

Figure 8:
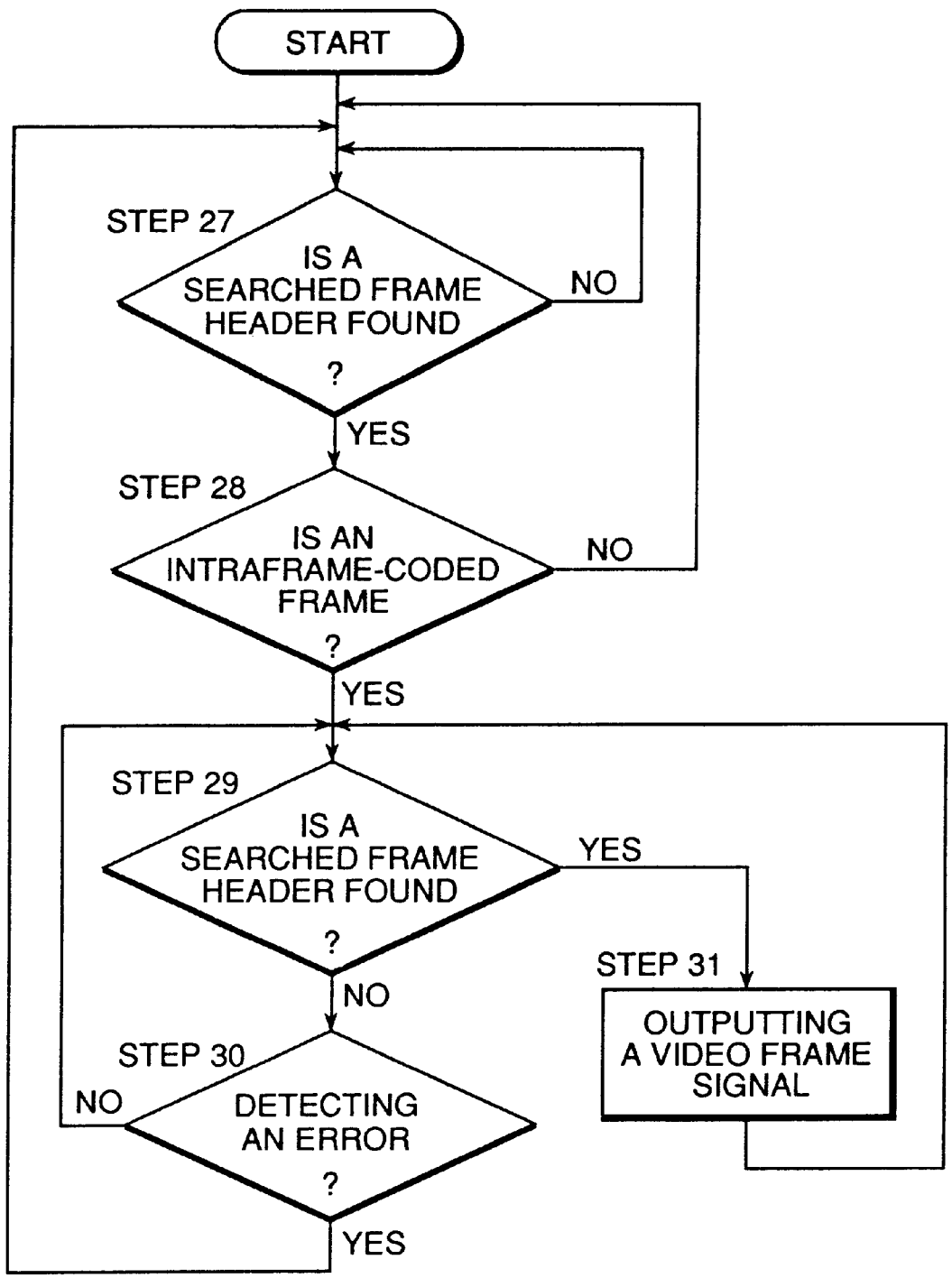
FIG. 8 is a flow chart depicting the operation of a video control portion of the embodiment of FIG. 5.

FIG. 8 is a flow chart depicting the control operation to the data selecting portion 22 by the video control portion 19 for extracting a errorless video-frame.

Figure 9:
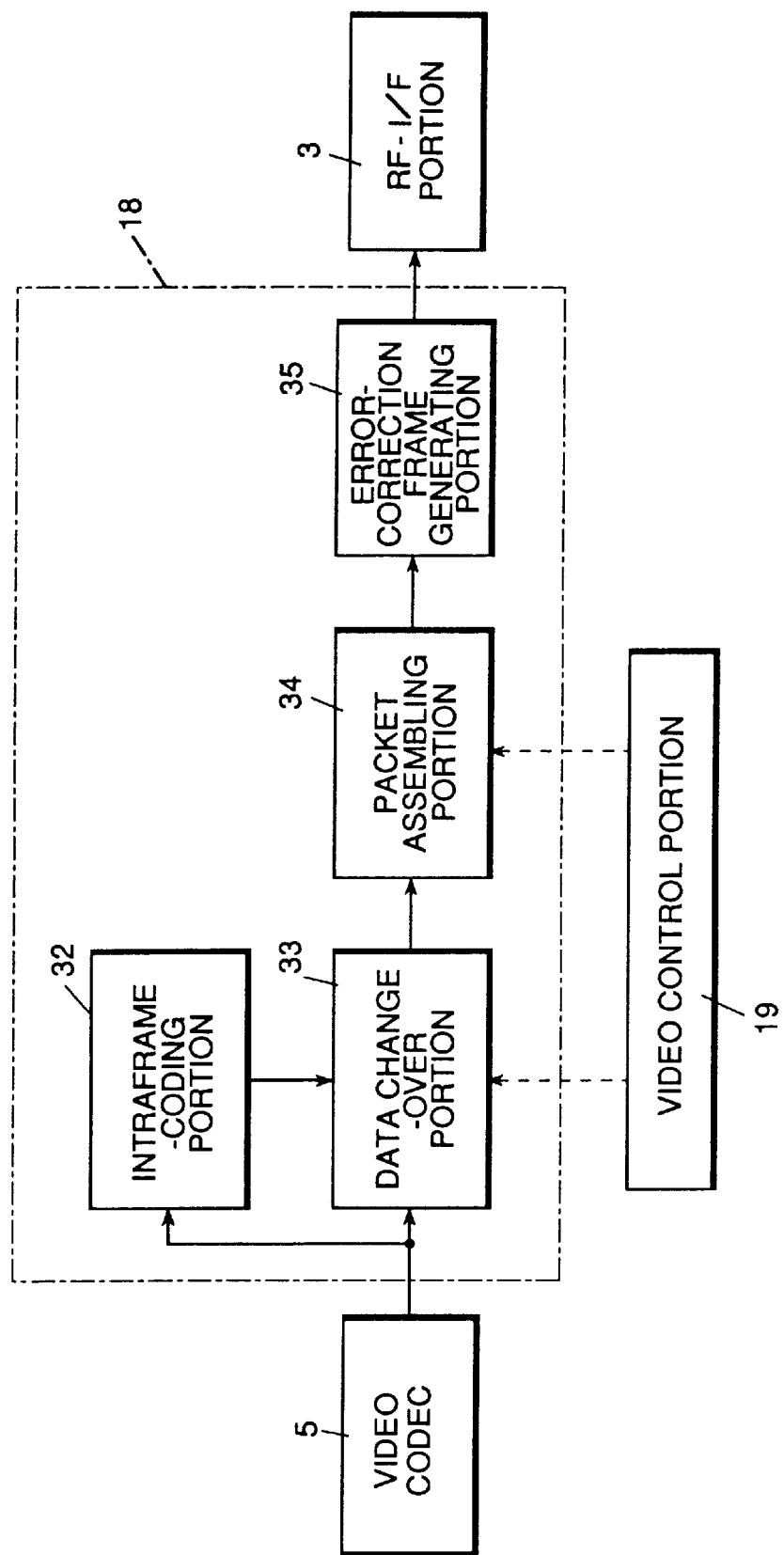
FIG. 9 is a construction block diagram of a transmission video-frame generating portion of the embodiment of FIG. 5.

FIG. 9 is a block diagram of the transmission video-frame generating portion 18 which is composed of an intraframe-coding portion 32 for intraframe-coding video frame data from the video codec portion 5, a data change-over portion 33 for changing over from interframe-coded data to intraframe-coded data and vice versa, a packet assembling portion 34 for generating a packet of video frame data from the data change-over portion 33 by adding thereto a control signal and an error-detection code, and an error-correction frame generating portion 35 for generating an error-correction frame by adding a synchronization signal and an error-correction code to the data outputted from the packet assembling portion 34.

FIG. 10 shows a format of data to be used in the block-diagram of FIG. 9. In FIG. 10, there is shown data 36 outputted from the video codec portion 5 to the intraframe coding portion 32 and from the data change-over portion 33 to the packet assembling portion 34, data 37 outputted from the packet assembling portion 34 to the error-correction frame generating portion 35 and data 38 outputted from the error-correction frame generating portion 35 to the RF-I/F portion 3.

The operation of the receiving side is first described below.

Data 23 outputted from the RF-I/F portion 3 is input to the transmission video-frame disassembling portion 17 wherein the error correcting portion 20 establishes synchronization of a frame by using a synchronization signal of the data 23, performs error-correction of packet data according to an error-correction code and outputs the error-corrected data 24 to the packet disassembling portion 21. The packet disassembling portion 21 performs error-detection of control signal and video data, informs the error-detection result and the control signal to the video control portion 19 and outputs data 25 containing only video data to the data selecting portion 22 which in turn extracts errorless data 26 according to the flowchart of FIG. 8 showing the control operation of the video control portion 19.

The above-mentioned control operation is as follows:

The data selecting portion 22 searches a frame header from data 25 (Step 27) and, if it found, then discriminates whether the header indicates an intraframe-coded frame or not (Step 28). When the frame header does not indicate an intraframe-coded frame, the process returns to Step 27 to search a frame header. When the frame header indicates an intraframe-coded frame, the process advances to Step 29 to search following frame header. In the case of no error-detection at Step 30 is informed from the packet disassembling portion 21 during the header searching (Step 29) and the following frame header is found, the process proceeds to Step 31 to output a video-frame signal. In the case of having detected an error (at Step 30) during searching the frame header (Step 29), the process returns to Step 27 to repeat searching a frame header.

The operation of the transmitting side is now described below.

Data 36 outputted from the video codec portion 5 is input to the transmission video-frame generating portion 18 wherein the intraframe-coding portion 32 generates intraframe-coded data and outputs the generated data to the data change-over portion 33. The data change-over portion 33 changes over from data outputted from the video codec portion 5 to data outputted from the intraframe-coding portion 32 or vice versa according to a control signal from the video control portion 19 and outputs the selected data to the packet assembling portion 34. The video control portion 19 directs changing-over to the data change-over portion 33 according to a control signal extracted by the transmission video-frame disassembling portion 17.

The packet assembling portion 34 generates data 37 from the data 36 by adding thereto a control signal for changing-over data at a receiving terminal and an error-correction code for detecting an error occurred in transmission and, then, outputs the generated data 37 to the error-correction frame generator 35. The video-control portion 19 requests intraframe-coded data by using a control signal added by the packet assembling portion 34 according to the condition of error-detection in a data from the video frame disassembling portion 17. The error-correction frame generating portion 35 generates data 38 from the received data 37 by adding thereto a synchronization signal and an error-correction code for correcting the transmission-error and outputs the generated data 38 to the RF-I/F portion 3.

According to the present invention it is possible to output only errorless video-data by performing error-detecting operation after correction of transmission errors in the received data. Furthermore, it is also possible to control transmission of intraframe-coded data for a receiving terminal, thus assuring for the latter to quickly restore the normal reproduction of video signals without displaying a fault image when transmission-error occurred.

What is claimed is:

1. A video communication terminal device comprising:

a video transmission adapter portion for receiving a transmission video-frame and outputting a coded video frame data, or generating a transmission video-frame from a coded video frame data to be transmitted, a video codec portion for decoding coded video frame data from the video transmission adapter portion to a video signal or coding a video signal, wherein the video transmission adapter portion is provided with:

a transmission video-frame disassembling portion for correcting an error, detecting an error in received transmission video-frame and outputting error corrected coded video frame data and information of error detection according to an instruction given by a video-control portion;

a transmission video-frame generating portion for generating a transmission video-frame for coded video frame data outputted from the video codec portion by adding thereto error-correction and error-detection codes and a control signal from the video control portion to be transmitted to a terminal; and the video control portion for receiving information of error detection and information of frame header detection from the transmission video-frame disassembling portion and for outputting the control signal generated from received control information indicative of error detection and information of frame header detection indicating a detection of an error in the received transmission video-frame.

2. A video communication terminal device as defined in claim 1, wherein the transmission video-frame disassembling portion is provided with:

an error-correcting portion for correcting an error in received transmission video-frame;

a packet disassembling portion for detecting an error in the error corrected transmission video-frame received from the error correcting portion and informing the video control portion of error detection as a control signal; and a data selecting portion for extracting an errorless video frame data from coded video frame data outputted from the packet disassembling Portion according to the instruction given from the video control portion.

3. A video communication terminal device comprising:

a video transmission adapter portion for receiving a transmission video-frame and outputting a coded video frame data, or generating a transmission video-frame from a coded video frame data to be transmitted, a video codec portion for decoding coded video frame data from the video transmission adapter portion to a video signal or coding a video signal, wherein the video transmission adapter portion is provided with:

a transmission video-frame disassembling portion for correcting an error, detecting an error in received transmission video-frame, outputting information of error detection, and extracting errorless coded video frame data to output to the video codec portion according to an instruction given by the video control portion;

a transmission video-frame generating portion for generating a transmission video-frame for coded video frame data outputted from the video codec portion by adding thereto error-correction and error-detection codes and a control signal from the video control portion to be transmitted to a terminal; and the video control portion for receiving information of error detection and information of frame header detection from the transmission video-frame disassembling portion, for outputting a control signal indicating a detection of error in the received transmission video-frame, and for giving the transmission video-frame disassembling portion an instruction for extracting a video frame according to information of error detection.

4. A video communication terminal device as defined in claim 3, wherein the transmission video-frame disassembling portion is provided with:

an error-correcting portion for correcting an error in received transmission video-frame;

a packet disassembling portion for detecting an error in the error corrected transmission video-frame received from the error correcting portion and informing the video control portion of error detection as a control signal; and a data selecting portion for extracting an errorless video frame data from coded video frame data outputted from the packet disassembling portion according to the instruction given from the video control portion.

5. A video radio-communication terminal device comprising:

a RF-1/F portion for extracting a digital video and digital voice signals from a multiplexed signal and multiplexing and converting digital video and digital voice signals into a multiplexed signal, a video transmission adapter portion for correcting an error and detecting an error in a video signal from the RF-1/F portion and extracting a errorless video-frame data or adding an error detection code and an error correction code to video frame data to be transmitted, a video codec portion for decoding video frame data from the video transmission adapter portion to a video signal or coding a video signal, wherein the video transmission adapter portion is provided with:

a transmission video-frame disassembling portion for correcting an error, detecting an error in a video signal outputted from the RF-1/F portion and outputting only errorless video-frame data;

a transmission video-frame generating portion for generating a transmission video-frame for video frame data outputted from the video codec portion by adding thereto error-correction and error-detection codes and a control signal for indicating a detection of error in the received video signal to other terminal to be communicated with; and a video control portion for giving the transmission video-frame disassembling portion an instruction for extracting a video frame according to information of error detection and information of frame header detection received from the transmission video-frame disassembling portion and a control signal from the other terminal to be communicated;

wherein the transmission video-frame disassembling portion is provided with:

an error-correcting portion for correcting an error in transmission video-data outputted from the RF-1/F portion;

a packet disassembling portion for detecting an error in the error-corrected video-frame received from the error-correcting portion and informing the video control portion of a control signal; and a data selecting portion for extracting an errorless video-frame from video data outputted from the packet disassembling portion according to the instruction given from the video control portion.

6. A video communication terminal device comprising:

a video transmission adapter portion for receiving a transmission video-frame and outputting a coded video frame data, or generating a transmission video-frame from a coded video frame data to be transmitted, a video codec portion for decoding coded video frame data from the video transmission adapter portion to a video signal or coding a video signal, wherein the video transmission adapter portion is provided with:

a transmission video-frame disassembling portion for correcting an error, detecting an error, extracting a control signal in received transmission video-frame generated at a remote terminal from information of error detection and information of frame header detection and outputting error corrected coded video frame data and the extracted control signal according to an instruction given by a video-control portion; and a video control portion for receiving the control signal from the transmission video-frame disassembling portion and for outputting information of error detection indicating an error in the received transmission video frame to a transmission video-frame generating portion.

7. A video communication terminal device as defined in claim 6, further including a transmission video-frame generating portion for generating a transmission video-frame for coded video frame data outputted from the video codec portion by adding thereto error-correction and error-detection to be transmitted provided with:

an intraframe-coding portion for intraframe-coding video frame data;

a data change-over portion for changing over coded video frame data to intraframe-coded data from the intraframe-coding portion and vice versa according to information of error detection at other terminal to be communicated with given from the video control portion;

a packet assembling portion for generating a packet of coded video frame data from the data change-over portion by adding thereto an error detection code and a control signal from the video control portion; and an error-correction frame-generating portion for generating an error correction frame for coded video frame data outputted from the packet-assembling portion.

* * * * *